United States Patent
Furusawa et al.

(10) Patent No.: US 8,993,186 B2
(45) Date of Patent: Mar. 31, 2015

(54) FUEL CELL SYSTEM

(75) Inventors: Koichiro Furusawa, Wako (JP); Toshikatsu Katagiri, Wako (JP); Akiji Ando, Wako (JP); Kentaro Nagoshi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 424 days.

(21) Appl. No.: 13/161,498

(22) Filed: Jun. 16, 2011

(65) Prior Publication Data

US 2011/0311889 A1 Dec. 22, 2011

(30) Foreign Application Priority Data

Jun. 17, 2010 (JP) .................................. 2010-138418

(51) Int. Cl.
*H01M 8/04* (2006.01)
*H01M 8/10* (2006.01)

(52) U.S. Cl.
CPC ........ *H01M 8/0435* (2013.01); *H01M 8/04029* (2013.01); *H01M 8/04141* (2013.01); *H01M 8/04149* (2013.01); *H01M 8/04223* (2013.01); *H01M 8/04335* (2013.01); *H01M 8/04358* (2013.01); *H01M 8/04529* (2013.01); *H01M 8/0485* (2013.01); *H01M 2008/1095* (2013.01); *Y02E 60/50* (2013.01)
USPC ............................ 429/442; 429/413; 429/450

(58) Field of Classification Search
None
See application file for complete search history.

(56) References Cited

U.S. PATENT DOCUMENTS

| | | | |
|---|---|---|---|
| 2007/0104986 A1* | 5/2007 | Tighe et al. | 429/24 |
| 2008/0176122 A1* | 7/2008 | Wake et al. | 429/24 |
| 2010/0196787 A1 | 8/2010 | Inoue et al. | |
| 2011/0104580 A1 | 5/2011 | Suematsu | |

FOREIGN PATENT DOCUMENTS

| | | |
|---|---|---|
| JP | 2007-012454 | 1/2007 |
| JP | 2009-016082 | 1/2009 |
| JP | 2010-003480 | 1/2010 |

* cited by examiner

*Primary Examiner* — Milton I Cano
*Assistant Examiner* — Carmen Lyles-Irving
(74) *Attorney, Agent, or Firm* — Mori & Ward, LLP

(57) ABSTRACT

A fuel cell system includes a fuel cell, a fuel gas passage, and an oxidant gas passage. The fuel cell includes a solid polymer membrane, a fuel electrode, and an oxidant electrode. A coolant flows into the fuel cell via a coolant passage to adjust a temperature of the fuel cell. An oxidant gas outlet temperature detector is configured to detect an outlet temperature of an oxidant gas discharged from an outlet of the oxidant gas passage. A coolant temperature detector is configured to detect a temperature of the coolant passing through an inlet or an outlet of the coolant passage. A dry-up controller is configured to decide that the solid polymer membrane is in a dry-up state when a temperature difference between the temperature of the coolant and the outlet temperature of the oxidant gas exceeds a first threshold value.

15 Claims, 7 Drawing Sheets

FUEL CELL SYSTEM

CROSS-REFERENCE TO RELATED APPLICATIONS

The present application claims priority under 35 U.S.C. §119 to Japanese Patent Application No. 2010-138418, filed Jun. 17, 2010. The contents of this application are incorporated herein by reference in their entirety.

BACKGROUND OF THE INVENTION

1. Field of the Invention

The present invention relates to a fuel cell system.

2. Discussion of the Background

There has been known a fuel cell installed in a fuel cell vehicle and the like, in which a membrane electrode assembly (MEA) is formed by sandwiching a solid polymer electrolyte membrane (hereinafter, called an electrolyte membrane) between an anode and a cathode from both sides, a pair of separators are arranged on both sides of the membrane electrode assembly to configure a planar unit fuel cell (hereinafter, called a unit cell), and a plurality of the unit cells are stacked so as to be a fuel cell stack. In the fuel cell, hydrogen is supplied as an anode gas (fuel gas) to the anode, air is supplied as a cathode gas (oxidant gas) to the cathode, and hydrogen ions generated by a catalytic reaction in the anode are passed through the electrolyte membrane and are moved to the cathode, thereby causing an electrochemical reaction with oxygen in the air in the cathode to generate electricity.

In the fuel cell, when the electrolyte membrane is brought into an excessively dry state (hereinafter, called a stack dry-up state), the power generation performance of the fuel cell is reduced, leading to the problem of deterioration of the electrolyte membrane. For this reason, to exhibit a desired power generation performance, the electrolyte membrane is required to be maintained in a wet state at all times.

Accordingly, Japanese Patent Application Laid-Open (JP-A) No. 2010-3480 describes a configuration in which a dew point detector is installed on an inlet side of an anode gas passage to decide whether or not a fuel cell is in the dry-up state, based on a detection value (anode inlet gas dew point) of the dew point detector.

In addition, Japanese Patent Application Laid-Open (JP-A) No. 2007-12454 discloses a technique in which when it is decided that there can be the stack dry-up, a dry-up solution process which repeats a low load operation and a high load operation to suppress temperature increase of a stack due to the continuous high load operation, and the humidified state of the fuel cell is maintained by generated water generated at the time of the high load operation.

SUMMARY OF THE INVENTION

According to one aspect of the present invention, a fuel cell system includes a fuel cell, a fuel gas passage, an oxidant gas passage, a coolant passage, an oxidant gas outlet temperature detector, a coolant temperature detector, and a dry-up controller. The fuel cell is to generate electric power using a fuel gas and an oxidant gas supplied to the fuel cell. The fuel cell includes a solid polymer membrane, a fuel electrode, and an oxidant electrode. The fuel gas passes along the fuel electrode in the fuel cell through the fuel gas passage. The oxidant gas passes along the oxidant electrode in the fuel cell through the oxidant gas passage. A coolant flows into the fuel cell via the coolant passage to adjust a temperature of the fuel cell. The oxidant gas outlet temperature detector is configured to detect an outlet temperature of the oxidant gas discharged from an outlet of the oxidant gas passage. The coolant temperature detector is configured to detect a temperature of the coolant passing through an inlet or an outlet of the coolant passage. The dry-up controller is configured to decide that the solid polymer membrane is in a dry-up state when a temperature difference between the temperature of the coolant and the outlet temperature of the oxidant gas exceeds a first threshold value.

According to another aspect of the present invention, a fuel cell system includes a fuel cell, a fuel gas passage, an oxidant gas passage, a coolant passage, a humidifier, an oxidant gas inlet temperature detector, an oxidant gas outlet temperature detector, and a dry-up controller. The fuel cell is to generate electric power using a fuel gas and an oxidant gas supplied to the fuel cell. The fuel cell includes a fuel electrode and an oxidant electrode. The fuel gas passes along the fuel electrode in the fuel cell through the fuel gas passage. The oxidant gas passes along the oxidant electrode in the fuel cell through the oxidant gas passage. A coolant flows into the fuel cell via the coolant passage to adjust a temperature of the fuel cell. The humidifier is configured to exchange moisture in the oxidant gas supplied to the fuel cell and moisture in the oxidant gas discharged from the fuel cell via a moisture exchange membrane. The oxidant gas inlet temperature detector is configured to detect an inlet temperature of the oxidant gas flowed into an inlet of the oxidant gas passage. The oxidant gas outlet temperature detector is configured to detect an outlet temperature of the oxidant gas discharged from an outlet of the oxidant gas passage. The dry-up controller is configured to decide that the fuel cell system is in a dry-up state when a temperature difference between the outlet temperature and the inlet temperature of the oxidant gas exceeds a second threshold value.

According to further aspect of the present invention, a fuel cell system includes a fuel cell, a fuel gas passage, an oxidant gas passage, a coolant passage, a coolant temperature detector, and a dry-up controller. The fuel cell is to generate electric power using a fuel gas and an oxidant gas supplied to the fuel cell. The fuel cell includes a solid polymer membrane, a fuel electrode, and an oxidant electrode. The fuel gas passes along the fuel electrode in the fuel cell through the fuel gas passage. The oxidant gas passes along the oxidant electrode in the fuel cell through the oxidant gas passage. A coolant flows into the fuel cell via the coolant passage to adjust a temperature of the fuel cell. The coolant temperature detector is configured to detect a temperature of the coolant passing through an inlet or an outlet of the coolant passage. The dry-up controller is configured to decide that the solid polymer membrane is in a dry-up state when the temperature of the coolant exceeds a third threshold value.

According to the other aspect of the present invention, a fuel cell system includes a fuel cell, a fuel gas passage, an oxidant gas passage, a coolant passage, a humidifier, a coolant temperature detector, and a dry-up controller. The fuel cell is to generate electric power using a fuel gas and an oxidant gas supplied to the fuel cell. The fuel cell includes a fuel electrode and an oxidant electrode. The fuel gas passes along the fuel electrode in the fuel cell through the fuel gas passage. The oxidant gas passes along the oxidant electrode in the fuel cell through the oxidant gas passage. A coolant flows into the fuel cell via the coolant passage to adjust a temperature of the fuel cell. The humidifier is configured to exchange moisture in the oxidant gas supplied to the fuel cell and moisture in the oxidant gas discharged from the fuel cell via a moisture exchange membrane. The coolant temperature detector is configured to detect a temperature of the coolant passing through an inlet or an outlet of the coolant passage. The dry-up controller is configured to decide that the fuel cell system is in a dry-up state when the temperature of the coolant exceeds a fourth threshold value.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
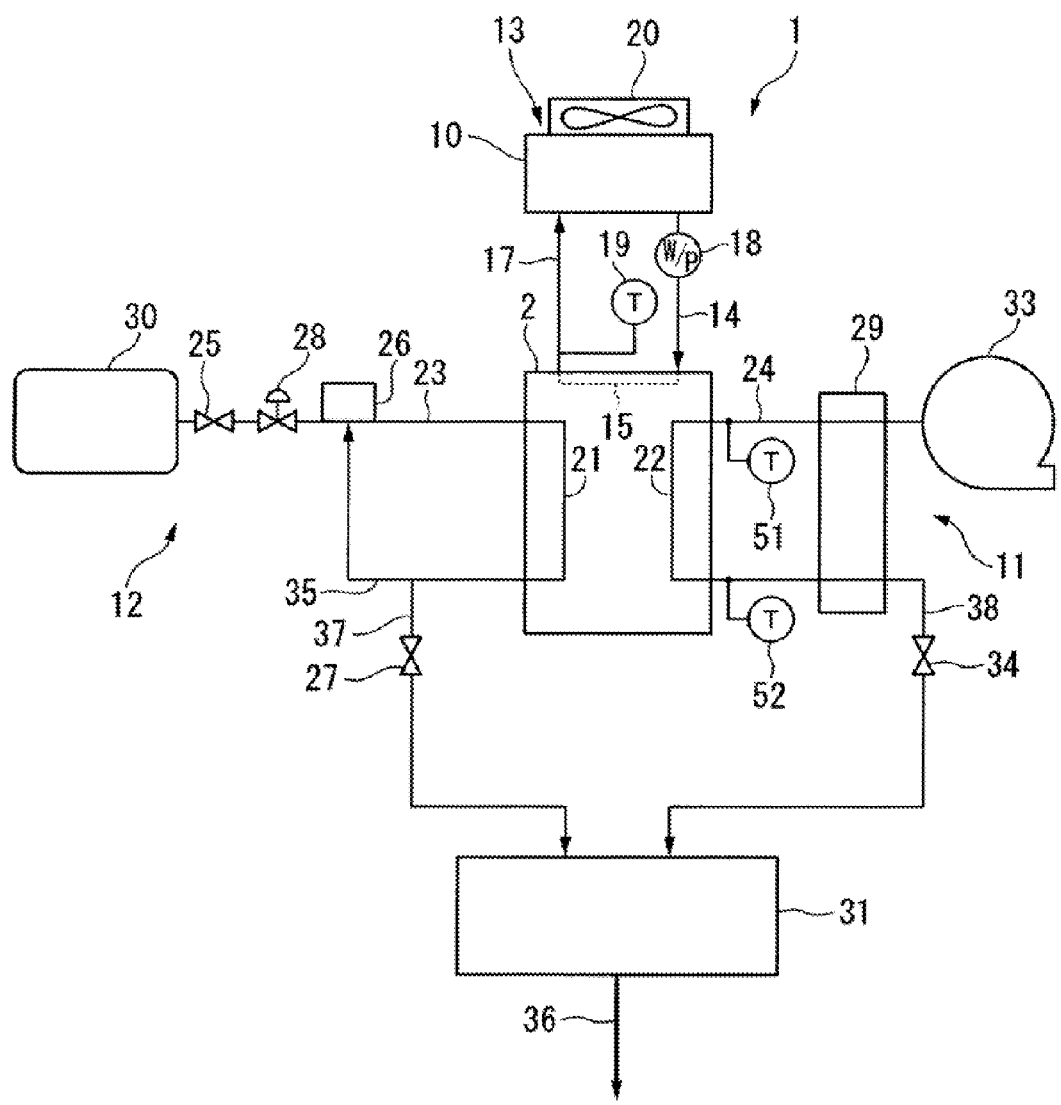
FIG. 1 is a schematic block diagram of a fuel cell system according to embodiments of the present invention.

The embodiments of the present invention will be described with reference to the drawings, wherein like reference numerals designate corresponding or identical elements throughout the various drawings.

(First Embodiment)

(Fuel Cell System)

FIG. 1 is a schematic block diagram of a fuel cell system. As shown in FIG. 1, a fuel cell system 1 is installed in, e.g., a fuel cell vehicle, not shown, and mainly includes a fuel cell stack 2 (hereinafter, called a fuel cell 2), a cathode gas supply means 11 for supplying air as a cathode gas (oxidant gas) to the fuel cell 2, an anode gas supply means 12 for supplying hydrogen as an anode gas (fuel gas), and an ECU (electric control unit) 6 (see FIG. 3) which overall controls these components.

The fuel cell 2 generates electrical power by an electrochemical reaction of an anode gas and a cathode gas, and has a solid polymer electrolyte membrane. The electrolyte membrane is sandwiched between an anode and a cathode from both sides to form a membrane electrode assembly (MEA), a pair of separators 43 (see FIG. 2) are arranged on both sides of the MEA to configure a cell 42 (see FIG. 2), and a plurality of the cells 42 are stacked to configure the fuel cell 2. Hydrogen gas is supplied as the anode gas to the anode of the fuel cell 2, and air is supplied as the cathode gas to the cathode of the fuel cell 2, so that hydrogen ions generated by a catalytic reaction ($H_2 \rightarrow 2H^+ + 2e^-$) in the anode are passed through the electrolyte so as to be moved to the cathode, and perform an electrochemical reaction with oxygen ($H_2 + O_2/2 \rightarrow H_2O$) in the cathode to generate electrical power. Further, the specific configuration of the cell 42 will be described later.

The cathode gas supply means 11 has an air pump 33 which delivers the cathode gas toward the fuel cell 2. The air pump 33 is connected to a cathode gas supply passage 24 for supplying the cathode gas to the fuel cell 2. The cathode gas supply passage 24 is connected to a cathode gas passage (oxidant gas passage) 22 facing the cathode on the inlet side of the fuel cell 2 via a humidifier 29. On the other hand, the outlet side of the cathode gas passage 22 is connected to a cathode off gas discharge passage 38 in which a cathode off gas provided for electrical power generation in the fuel cell 2 and generated water generated by the fuel cell 2 by electrical power generation and dewing are passed. An inlet gas temperature sensor 51 for measuring the temperature of the cathode gas flowed from the cathode gas supply passage 24 into the cathode gas passage 22 (cathode inlet gas temperature Tcain) is connected to the vicinity of the inlet of the cathode gas passage 22. An outlet gas temperature sensor 52 for measuring the temperature of the cathode gas flowed from the cathode gas passage 22 into the cathode off gas discharge passage 38 (cathode outlet gas temperature Tcaout) is connected to the vicinity of the outlet of the cathode gas passage 22.

The cathode off gas discharge passage 38 is connected to a dilution box 31 via the humidifier 29. The humidifier 29 in which a large number of hollow fiber-like moisture permeable membranes (hollow fiber membranes) are bundled therein is housed in a housing (not shown). When gases having different water contents are each passed to the inside and the outside of the hollow fiber membranes, the moisture in the gas having a large water content is passed through the hollow fiber membranes so as to be moved to the gas having a small water content. In other words, in the present embodiment, the cathode gas delivered from the air pump 33 is passed to the inside of the hollow fiber membranes and the cathode off gas including the generated water is passed to the outside, so that the moisture is moved from the cathode off gas, which is provided for electrical power generation in the fuel cell 2 and becomes wet, to the cathode gas. Accordingly, the cathode gas can be humidified before supplied to the fuel cell 2.

Then, the cathode gas delivered by the air pump 33 is passed through the cathode gas supply passage 24, and is supplied to the cathode gas passage 22 of the fuel cell 2. Oxygen in the cathode gas is provided as an oxidant for electrical power generation in the cathode gas passage 22, and is discharged as the cathode off gas from the fuel cell 2 to the cathode off gas discharge passage 38. The cathode off gas discharge passage 38 is connected to the dilution box 31, and then, the cathode off gas is exhausted to the outside of the vehicle. In addition, the cathode off gas discharge passage 38 has a back pressure valve 34 for regulating the pressure of the cathode gas in the cathode gas passage 22 of the fuel cell 2.

On the other hand, the anode gas supply means 12 has a hydrogen tank 30 filled with the anode gas. The hydrogen tank 30 is connected to an anode gas passage (fuel gas passage) 21 facing the anode on the inlet side of the fuel cell 2 via an anode gas supply passage 23. The outlet side of the anode gas passage 21 is connected to an anode off gas discharge passage 35 to which an anode off gas provided for electrical power generation in the fuel cell 2 is passed.

The anode gas supply passage 23 is connected to a shutoff valve 25, a regulator 28, and an ejector 26 from the upstream side in this order.

The shutoff valve 25 is of an electromagnetic drive type, and can shut off supply of the anode gas from the hydrogen tank 30.

The regulator 28 uses the pressure (cathode inlet gas pressure) of the cathode gas supplied to the fuel cell 2 as a signal pressure to pressure-regulate (pressure-reduce) the high-pressure anode gas supplied from the hydrogen tank 30 so that it can have the pressure in a predetermined range according to the signal pressure. Accordingly, the anode-cathode pressure difference between the cathode and the anode of the fuel cell 2 is held to the predetermined pressure. The anode gas pressure-regulated by the regulator 28 is passed through the ejector 26, and is supplied to the fuel cell 2.

Furthermore, the anode off gas discharge passage 35 is connected to the ejector 26, and circulates the anode off gas discharged from the fuel cell 2 so that it can be reused as the anode gas of the fuel cell 2. Further, the anode off gas discharge passage 35 has a purge gas discharge passage 37 which is branched midway therein. The purge gas discharge passage 37 is connected to the dilution box 31. In addition, the purge gas discharge passage 37 has an electromagnetic drive type purge valve 27.

The dilution box 31 has in its inside a reserving chamber which reserves the anode off gas introduced from the purge gas discharge passage 37 and is connected to the cathode off gas discharge passage 38. That is, in the reserving chamber, the anode off gas is diluted by the cathode off gas, and is thereafter discharged from a discharge passage 36 to the outside of the vehicle. It is noted that the cathode off gas is supplied to the dilution box 31 based on the concentration of the anode off gas introduced from the purge gas discharge passage 37.

In addition, the fuel cell system 1 has a cooling means 13 which passes a coolant into the fuel cell 2 to cool the fuel cell 2. The cooling means 13 has a coolant passage 15 via which the coolant flows into the fuel cell 2, a radiator (coolant heat exchanger) 10 which cools the coolant, a coolant supply passage 14 through which the coolant discharged from the radiator 10 passes toward the coolant passage 15, and a coolant discharge passage 17 through which the coolant discharged from the coolant passage 15 passes toward the radiator 10. The coolant supply passage 14 has a water pump (W/P) 18 which circulates the coolant between the fuel cell 2 and the radiator 10. The coolant discharge passage 17 is connected to a coolant temperature sensor 19 for measuring the temperature (coolant outlet temperature Twout) of the coolant discharged from the fuel cell 2. The radiator 10 has a coolant cooling fan (fan) 20. The coolant cooling fan 20 is operated to deliver air to the radiator 10 for promoting cooling of the coolant. An electrical power generation current meter (not shown) that measures an electric current value taken out from the fuel cell 2 is provided in the fuel cell 2.

(Cell)

Figure 2:
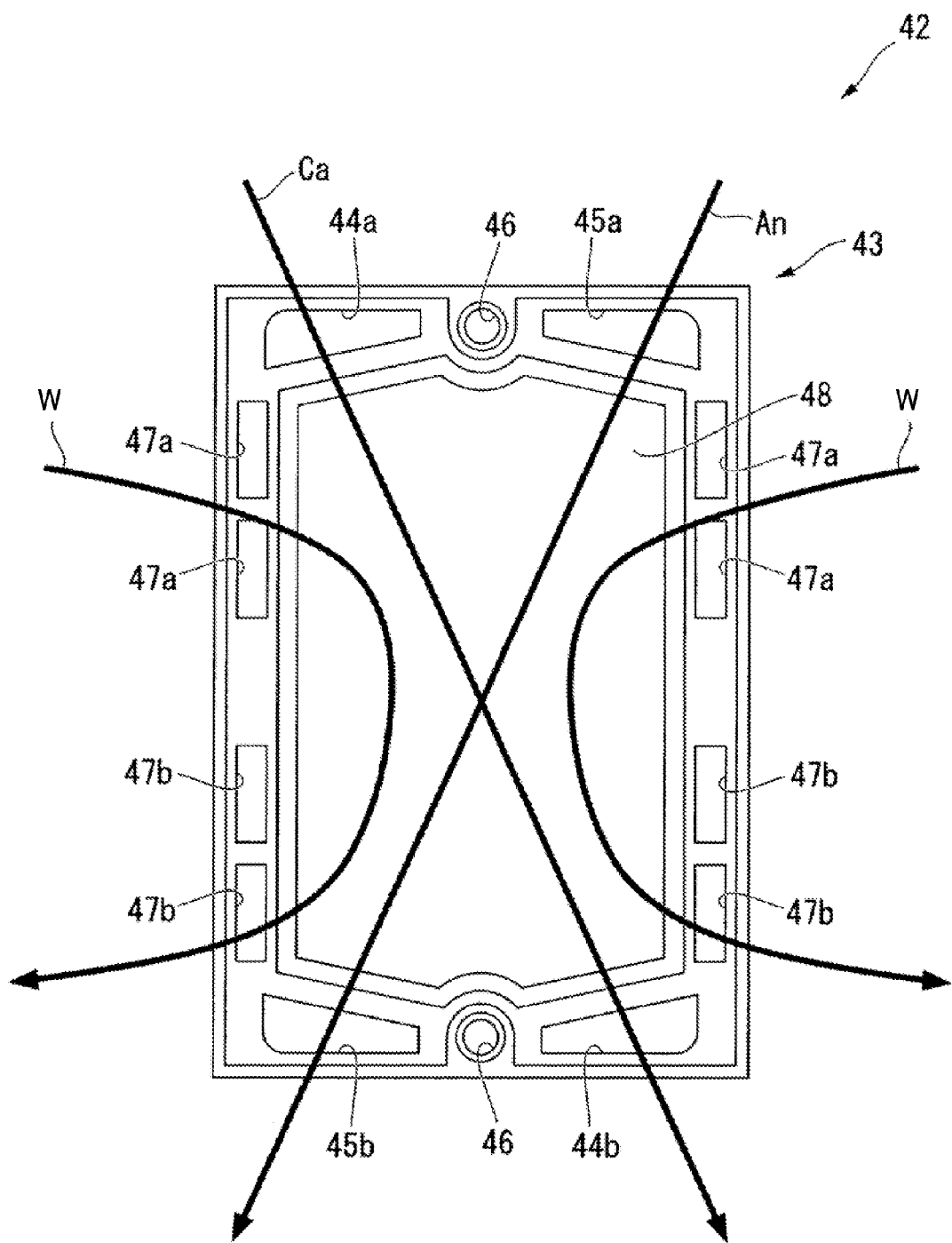
FIG. 2 is a plan view of a cell.

Next, the configuration of the cell 42 of the fuel cell 2, as described above, will be specifically described. FIG. 2 is a plan view of the cell.

As described above, the cell 42 is formed by sandwiching both sides of the MEA (not shown) between the pair of separators 43, and has a rectangular shape in plan view in which the long side direction coincides with the height direction of the fuel cell vehicle. In FIG. 2, the up-down direction in the drawing coincides with the up-down direction of the fuel cell vehicle, and the depth direction in the drawing coincides with the front-rear direction of the fuel cell vehicle.

The upper edge in the height direction of the cell 42 is formed with a cathode gas inlet communication hole 44a for supplying the cathode gas, and an anode gas inlet communication hole 45a for supplying the anode gas, which are communicated in the thickness direction of the cell 42 (in the front-rear direction of the fuel cell vehicle).

On the other hand, the lower edge of the cell 42 is formed with a cathode gas outlet communication hole 44b for discharging the cathode gas, and an anode gas outlet communication hole 45b for discharging the anode gas, which are communicated in the thickness direction of the cell 42. The cathode gas inlet communication hole 44a, the cathode gas outlet communication hole 44b, the anode gas inlet communication hole 45a, and the anode gas outlet communication hole 45b each have an opening cross section formed in a substantially trapezoidal shape. While the cathode gas inlet communication hole 44a and the cathode gas outlet communication hole 44b are arranged in the diagonal positions of the separators 43, the anode gas inlet communication hole 45a and the anode gas outlet communication hole 45b are arranged in the diagonal positions of the separators 43. Tie rod insertion holes 46 for inserting tie rods (not shown) fastening the fuel cell 2 therethrough are provided between the cathode gas inlet communication hole 44a and the anode gas inlet communication hole 45a and between the cathode gas outlet communication hole 44b and the anode gas outlet communication hole 45b.

The cathode gas passage 22 (not shown in FIG. 2) which is communicated with the cathode gas inlet communication hole 44a and the cathode gas outlet communication hole 44b is formed on the side of the surface opposite the MEA (the back side in FIG. 2) of one of the pair of separators 43 (cathode side separator). In addition, the anode gas passage 21 (not shown in FIG. 2) which is communicated with the anode gas inlet communication hole 45a and the anode gas outlet communication hole 45b is formed on the side of the surface opposite the MEA (the back side in FIG. 2) of the other separator 43 (anode side separator).

Accordingly, the anode gas and the cathode gas supplied to the fuel cell 2 are passed from the upper portion of the cell 42 (the cathode gas inlet communication hole 44a and the anode gas inlet communication hole 45a) toward the lower portion thereof (the cathode gas outlet communication hole 44b and the anode gas outlet communication hole 45b) in the height direction (the diagonal directions of the cell 42) between each of the separators and the MEA. It is noted that in FIG. 2, the flow of the cathode gas in the MEA plane is indicated by an arrow Ca, and the flow of the anode gas therein is indicated by an arrow An.

In addition, the upper half portion on either side in the width direction of the cell 42 is formed with plural (e.g., two) coolant inlet communication holes 47a for introducing the coolant into the cell 42, and each of the lower half portions thereof is formed with plural (e.g., two) coolant outlet communication holes 47b for discharging the coolant from the cell 42. That is, for example, the two coolant inlet communication holes 47a and the two coolant outlet communication holes 47b are formed so as to be rectangular in plan view and to have the same opening cross section area, and are arrayed side by side along the height direction on both sides in the width direction of the cell 42.

A coolant passage 48, which is communicated with the coolant inlet communication holes 47a and the coolant outlet communication holes 47b, is formed on the surface (the surface in FIG. 2) which is opposite the separators 43 of the adjacent cell 42 in each of the separators 43. In this case, while the coolant introduced from the coolant inlet communication holes 47a on both sides in the width direction of the separators 43 is passed in the coolant passage 48 toward the center portion in the width direction, the coolant is passed downward (arrows W in FIG. 2). Thereafter, the coolant is discharged from the coolant outlet communication holes 47b on both sides in the width direction. That is, in the present embodiment, all the outlets of the cathode gas and the anode gas (the cathode gas outlet communication hole 44b and the anode gas outlet communication hole 45b) and the outlets of the coolant (the coolant outlet communication holes 47b) are arranged in the same direction of the cell 42 (in the lower half portion). Further, the cells 42 are stacked so that the coolant inlet communication holes 47a, the coolant outlet communication holes 47b, and the coolant passage 48 of each of the cells 42 configure the coolant passage 15 (see FIG. 1) in which the coolant is passed in the fuel cell 2.

(ECU)

Figure 3:
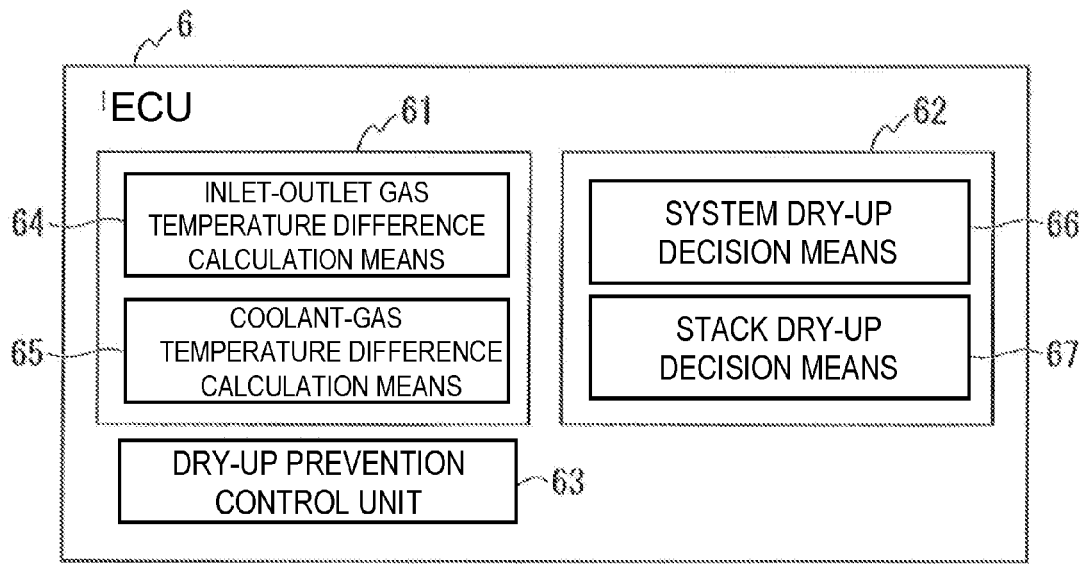
FIG. 3 is a system block diagram of an ECU according to a first embodiment.

FIG. 3 is a block diagram of the ECU.

As shown in FIG. 3, the ECU 6 overall controls components of the fuel cell system 1, and mainly includes a temperature difference calculation means 61, a dry-up decision means (dry-up control unit) 62, and a dry-up prevention control unit 63.

The temperature difference calculation means 61 includes a cathode inlet-outlet gas temperature difference calculation means 64, and a coolant-gas temperature difference calculation means 65.

A cathode inlet-outlet gas temperature difference calculation means 64 calculates a cathode inlet-outlet gas temperature difference $Tdca$ ($Tdca=Tcaout-Tcain$) between the cathode inlet gas temperature $Tcain$ and the cathode outlet gas temperature $Tcaout$ measured by the temperature sensors 51 and 52

A coolant-gas temperature difference calculation means 65 calculates a coolant-gas temperature difference $Tdwc$ ($Tdwc=Twout-Tcaout$) between the cathode outlet gas temperature $Tcaout$ measured by the outlet gas temperature sensor 52 and the coolant outlet temperature $Twout$ measured by the coolant temperature sensor 19.

The dry-up decision means 62 includes a system dry-up decision means 66, and a stack dry-up decision means 67. Here, the stack dry-up means is the state that the electrolyte membrane of the fuel cell 2 is dried excessively, the system dry-up means is the state that the entire fuel cell system 1 is dried excessively; specifically, the state that the stack dry-up is continued so that the hollow fiber membranes of the humidifier 29 in addition to the electrolyte membrane are dried excessively.

Figure 4:
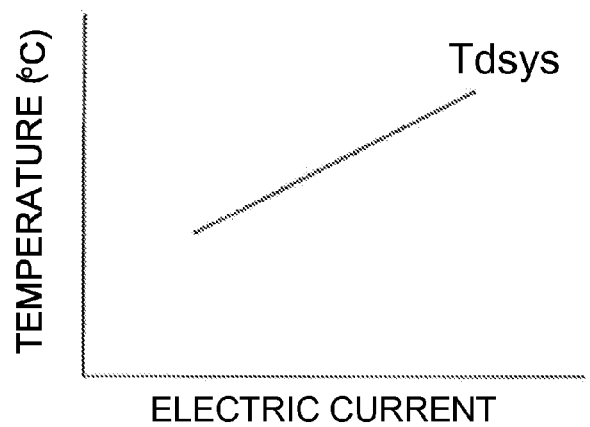
FIG. 4 is a graph showing the relation between electrical power generation current values and a stack dry-up decision threshold value.

A system dry-up decision means 66 stores a system dry-up decision threshold value (a second threshold value) $Tdsys$, and compares the system dry-up decision threshold value $Tdsys$ with the cathode inlet-outlet gas temperature difference $Tdca$ calculated by the cathode inlet-outlet gas temperature difference calculation means 64, thereby deciding the dry-up state (system dry-up) of the fuel cell system 1. Specifically, when the cathode inlet-outlet gas temperature difference $Tdca$ is higher than the system dry-up decision threshold value $Tdsys$, it is decided that there can be the system dry-up. As shown in FIG. 4, the system dry-up decision means 66 stores a table showing the relation between the electrical power generation current of the fuel cell 2 and the system dry-up decision threshold value $Tdsys$. The system dry-up decision threshold value $Tdsys$ is increased according to increase of the electrical power generation current value. This is because as the electrical power generation current value is increased, the heat generation amount is increased, so that the cathode outlet gas temperature $Tcaout$ is increased to increase the cathode inlet-outlet gas temperature difference $Tdca$.

Returning to FIG. 3, the stack dry-up decision means 67 stores a stack dry-up decision threshold value $Tdstk$ (a first threshold value), and compares the stack dry-up decision threshold value $Tdstk$ with the coolant-gas temperature difference $Tdwc$ calculated by the coolant-gas temperature difference calculation means 65, thereby deciding the dry-up state (stack dry-up) of the fuel cell 2. Specifically, when the coolant-gas temperature difference $Tdwc$ is higher than the stack dry-up decision threshold value $Tdstk$, it is decided that the stack dry-up can start. Further, at the time of normal electrical power generation, the coolant outlet temperature $Twout$ and the cathode outlet gas temperature $Tcaout$ are changed in the state that the cathode outlet gas temperature $Tcaout$ is higher than or equal to the coolant outlet temperature $Twout$. For this reason, in the present embodiment, the stack dry-up decision threshold value $Tdstk$ is set to the point in which the coolant outlet temperature $Twout$ is slightly higher than the cathode outlet gas temperature $Tcaout$ (e.g., about 1° C.). However, since the setting of the stack dry-up decision threshold value $Tdstk$ depends on the operating conditions of the fuel cell system (such as the cathode stoichiometry and the flow rate of the coolant), it is preferably determined by test.

The dry-up prevention control unit 63 performs the dry-up prevention control when it is decided based on the decided result of the dry-up decision means 62 that there can be the system dry-up or the stack dry-up. Specifically, when the system dry-up decision means 66 decides that there can be the system dry-up, the dry-up prevention control unit 63 performs control which limits the output current value taken out from the fuel cell 2.

In addition, when the stack dry-up decision means 67 decides that the stack dry-up can be started, the dry-up prevention control unit 63 performs at least one of the following stack dry-up prevention controls (1) to (4).

(1) The rotational speed of the water pump 18 is increased to increase the flow rate of the coolant, thereby promoting heat reception from the fuel cell 2 to the coolant.

(2) The rotational speed of the coolant cooling fan 20 is increased to improve the heat radiation efficiency of the radiator 10.

(3) The opening of the back pressure valve 34 is reduced to increase the pressure of the cathode gas supplied to the fuel cell 2 and the pressure of the cathode off gas discharged from the fuel cell 2, thereby facilitating condensation of moisture.

(4) The amount of the cathode gas supplied into the fuel cell 2 is reduced (or the stoichiometry is reduced). In this case, when the humidity of the cathode off gas is constant and the amount of water moved from the cathode off gas to the cathode gas in the humidifier 29 (the amount of the generated water received by the cathode gas) is constant, the smaller cathode gas flow rate can increase the humidity of the cathode gas as compared with the larger cathode gas flow rate, so that the moisture rate can be improved. Further, the stoichiometry is the amount of the cathode gas inputted into the fuel cell 2 with respect to the necessary consumption amount.

(The Control Method of the Fuel Cell System)

Next, the control method of the fuel cell system 1 will be described. Specifically, the dry-up decision control of the fuel cell system 1 and the fuel cell 2 will be described.

(Occurrence Mechanism of the Dry-Up)

Figure 5:
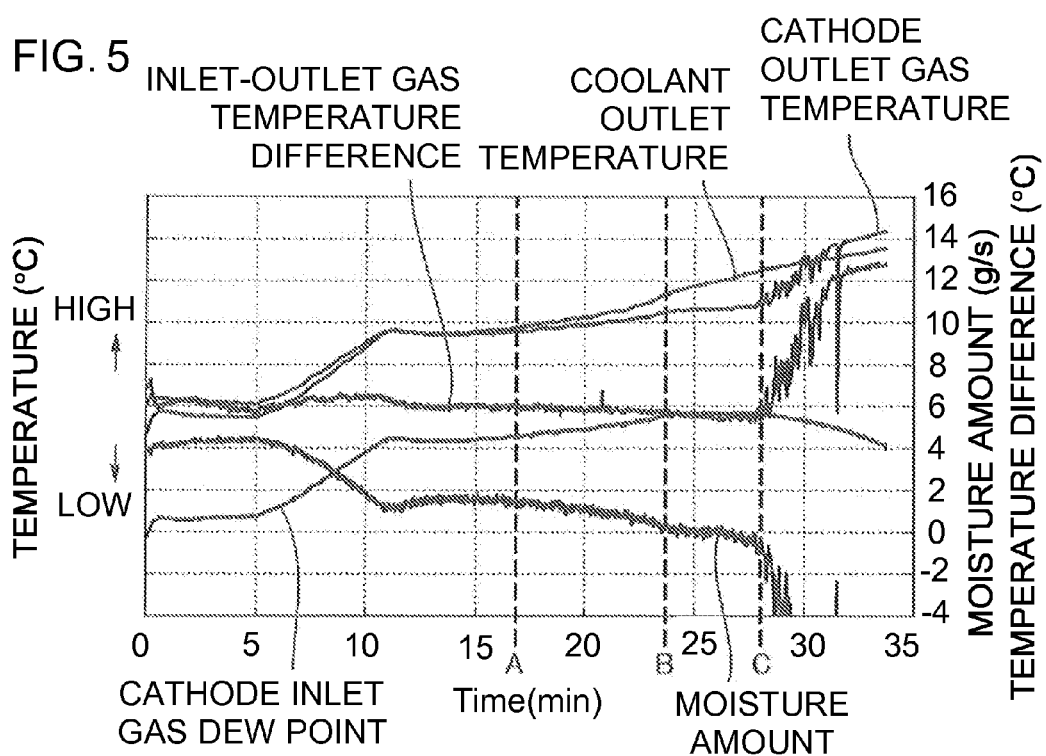
FIG. 5 is a graph showing the relation between time (min) and cathode outlet gas temperatures Tcaout (° C.), cathode inlet-outlet gas temperature differences Tdca (° C.), coolant outlet temperatures Twout (° C.), moisture amounts (water balance) Q (g/sec), and cathode inlet gas dew points Thcain (° C.)
Figure 6:
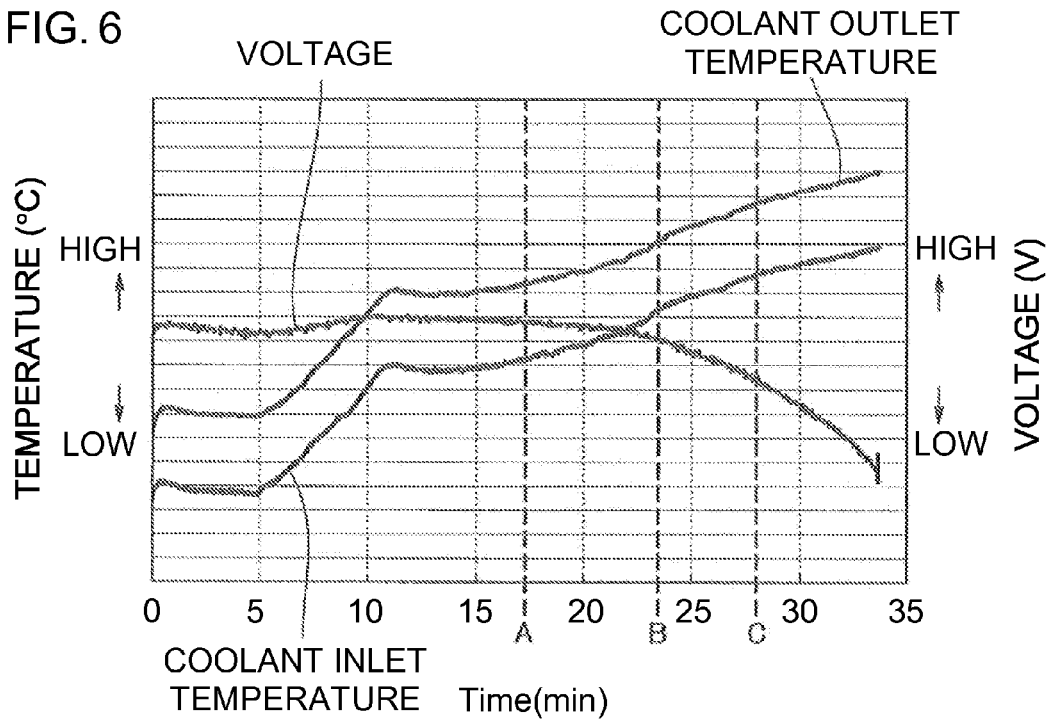
FIG. 6 is a graph showing the relation between time (min) and coolant inlet temperatures Twin, coolant outlet temperatures Twout (° C.), and voltages (V)

Here, the present inventors have drawn by experiment that the following phenomenon in the occurrence mechanism of the stack dry-up in which the electrolyte membrane of the fuel cell 2 is dried excessively and the system dry-up in which the entire fuel cell system 1 is dried excessively occurs. FIG. 5 is a graph showing the relation between time (min) and the cathode outlet gas temperatures Tcaout (° C.), the cathode inlet-outlet gas temperature differences Tdca (° C.), the coolant outlet temperatures Twout (° C.), the moisture amounts (water balance) Q (g/sec), and the cathode inlet gas dew points Thcain (° C.). In addition, FIG. 6 is a graph showing the relation between time (min) and the coolant inlet temperatures Twin, the coolant outlet temperatures Twout (° C.), and the voltages (V).

It is noted that, when the moisture amount included in the cathode gas supplied to the fuel cell 2 is the inputted moisture amount Qin (g/sec), the amount of the generated water generated by electrical power generation and dewing in the fuel cell 2 is the generated water amount QW (g/sec), and the moisture amount included in the cathode off gas discharged from the fuel cell 2 is the discharged moisture amount Qout (g/sec), the humidified water amount Q (g/sec) as the water balance in the fuel cell 2 can be expressed by Q=Qin+QW−Qout.

At the time of electrical power generation of the fuel cell system 1, when the outside air temperature in which the fuel cell vehicle is placed is relatively high, when the vehicle speed is low at the time of driving up a slope, and when the heat generation amount of the fuel cell 2 is excessively large due to deterioration of the fuel cell 2, the temperature of the coolant passed through the cooling means 13 is increased. Further, the heat generation amount is increased due to deterioration of the fuel cell 2 because when the fuel cell 2 is deteriorated to reduce the power generation performance of the fuel cell 2, so that heat loss at the time of electrical power generation is increased.

As shown in FIG. 5, when the coolant outlet temperature Twout is increased, the generated water in the fuel cell 2 is easily vaporized, so that temperature increase of the cathode gas can be suppressed by heat of vaporization at the time of vaporization. As a result, the coolant outlet temperature Twout is higher than the cathode outlet gas temperature Tcaout (Twout>Tcaout), so that the temperature difference Tdwc between the coolant outlet temperature Twout and the cathode outlet gas temperature Tcaout starts to occur (time A in FIG. 5). In the fuel cell system 1 of the present embodiment, this state is set to the start conditions of the stack dry-up in which the electrolyte membrane of the fuel cell 2 starts to be dried.

When the generated water is vaporized due to temperature increase of the coolant, the vaporized generated water (water vapor) is discharged together with the cathode gas, so that the moisture amount discharged from the fuel cell 2 (discharged moisture amount Qout) is increased to circulate more moisture in the fuel cell system 1. However, while the discharged moisture amount Qout is increased, the inputted moisture amount Qin (g/sec) and the generated water amount QW (g/sec) are not changed. As described above, the humidified water amount Q as the water balance in the fuel cell 2 is expressed by Q=Qin+QW−Qout, so that the humidified water amount Q is eventually decreased. As a result, the electrolyte membrane of the fuel cell 2 starts to be dried.

When the stack dry-up is started, the power generation performance of the fuel cell 2 starts to be reduced. The reduced power generation performance decreases the generated water amount QW in the fuel cell 2. In addition, the reduced power generation performance of the fuel cell 2 increases heat loss at the time of electrical power generation to increase the heat generation amount of the fuel cell 2. Thereby, since the coolant outlet temperature Twout is still higher, the discharged moisture amount Qout is increased. As a result, the humidified water amount Q is decreased gradually to advance the stack dry-up.

When the stack dry-up is continued as-is to continue to reduce the humidified water amount Q, the humidified water amount Q is eventually lower than 0 (g/sec) (time B in FIG. 5). That is, the discharged moisture amount Qout is higher than the total of the inputted moisture amount Qin and the generated water amount QW, so that moisture is taken out from the fuel cell. As a result, the fuel cell is brought into the complete stack dry-up state in which the electrolyte membrane of the fuel cell 2 is dried excessively.

In the complete stack dry-up state, the vaporization amount of the generated water in the fuel cell 2 is decreased to reduce heat of vaporization, so that the cathode gas cannot be humidified. For this reason, the discharged moisture amount Qout included in the cathode off gas discharged from the fuel cell 2 is decreased.

When the discharged moisture amount Qout starts to be decreased, the moisture amount supplied to the humidifier 29 is reduced, so that the humidifier 29 (hollow fiber membranes) starts to be dried. That is, the system dry-up in which the hollow fiber membranes of the humidifier 29 in addition to the electrolyte membrane are dried is started. Thereby, the humidification performance of the humidifier 29 is reduced, so that the moisture amount of the cathode gas supplied to the fuel cell 2 (cathode inlet gas dew point Thcain) starts to be decreased. As a result, the fuel cell system is brought into the system dry-up state in which the hollow fiber membranes of the humidifier 29 are dried excessively, so that the voltage is lowered (after time C in FIGS. 5 and 6).

Here, when the stack dry-up is started, temperature increase of the cathode gas is suppressed, so that the temperature difference between the cathode outlet gas temperature Tcaout and the cathode inlet gas temperature Tcain (cathode inlet-outlet gas temperature difference Tdca) is substantially constantly changed from the stack dry-up start point.

However, in the complete stack dry-up state, as described above, the vaporization amount of the generated water in the fuel cell 2 is decreased to reduce heat of vaporization, so that the cathode outlet gas temperature Tcaout is increased abruptly. As a result, the cathode inlet-outlet gas temperature difference Tdca is increased abruptly. In the present embodiment, this state is set to the decision conditions of the system dry-up.

(Dry-Up Decision Control)

Figure 7:
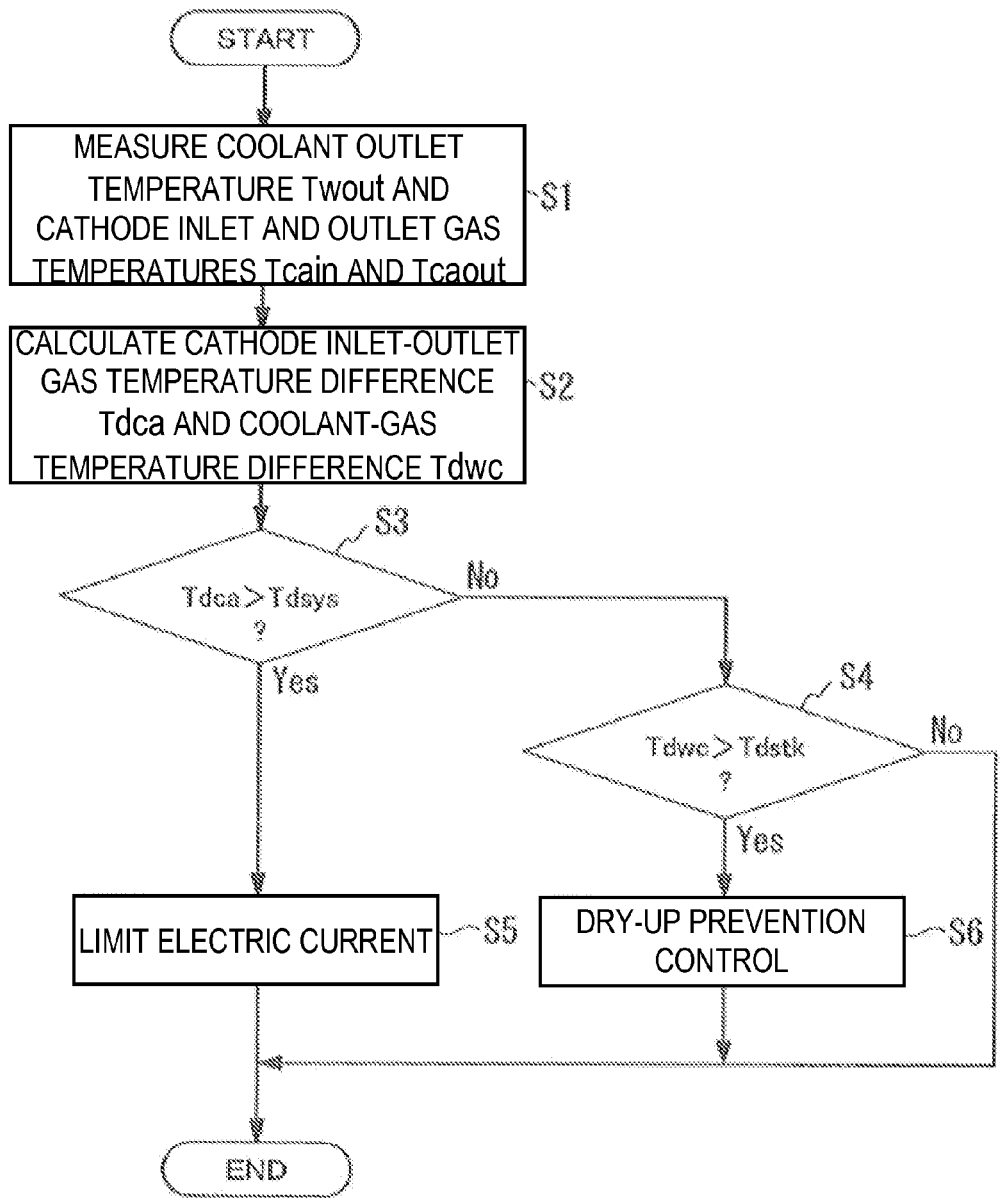
FIG. 7 is a flowchart for describing a control method of the fuel cell system according to the first embodiment.

FIG. 7 is a flowchart showing the dry-up decision control of the fuel cell system.

As shown in FIG. 7, in step S1, the coolant outlet temperature Twout, the cathode inlet gas temperature Tcain, and the cathode outlet gas temperature Tcaout are measured by the temperature sensors 19, 51, and 52.

Next, in step S2, the cathode inlet-outlet gas temperature difference Tdca and the coolant-gas temperature difference Tdwc are calculated. Specifically, the cathode inlet-outlet gas temperature difference calculation means 64 uses the cathode inlet gas temperature Tcain and the cathode outlet gas temperature Tcaout measured in step S1 to calculate the cathode inlet-outlet gas temperature difference Tdca (Tdca=Tcaout−Tcain). In addition, the coolant-gas temperature difference calculation means 65 uses the cathode outlet gas temperature Tcaout and the coolant outlet temperature Twout measured in step S1 to calculate the coolant-gas temperature difference Tdwc (Tdwc=Twout−Tcaout).

Next, in step S3, it is decided whether or not the fuel cell system 1 can be in the system dry-up state. Specifically, the system dry-up decision means 66 decides whether or not the cathode inlet-outlet gas temperature difference Tdca calculated in step S2 is higher than the system dry-up decision threshold value Tdsys stored in the system dry-up decision means 66.

When the decided result in step S3 is "NO" (Tdca≤Tdsys), it is decided that there cannot be the system dry-up, so that the routine is advanced to step S4.

When the decided result in step S3 is "YES" (Tdca>Tdsys), it is decided that the fuel cell system 1 can be in the system dry-up state (the state of time C in FIG. 5), so that the routine is advanced to step S5. As described above, when the system dry-up is started in the complete stack dry-up state, the cathode gas cannot be humidified, so that the cathode outlet gas temperature Tcaout starts to be increased. For this reason, in the present embodiment, the system dry-up is decided based on the cathode inlet-outlet gas temperature difference Tdca, so that the dew point of the cathode off gas is decreased excessively to reduce the humidification performance of the humidifier 29, so that it can be decided that the system dry-up occurs.

In step S5, the dry-up prevention control unit 63 performs control which limits an output current value taken out from the fuel cell 2 (or reduces the stoichiometry). Thereby, heat generation of the fuel cell 2 is suppressed to lower the coolant outlet temperature Twout, so that vaporization of the generated water generated in the fuel cell 2 can be prevented. For this reason, the generated water amount QW in the fuel cell 2 can be increased to increase the humidified water amount Q in the fuel cell 2, so that the inside of the fuel cell 2 can be humidified. Thereby, the stack dry-up state in the fuel cell 2 can be eliminated. The eliminated stack dry-up state in the fuel cell 2 can gradually humidify the cathode off gas discharged from the fuel cell 2 to increase the moisture amount supplied to the humidifier 29. For this reason, the humidification performance of the humidifier 29 can be recovered, so that the amount of water moved from the cathode off gas to the cathode gas in the humidifier 29 is increased. As a result, the humidity of the cathode gas supplied to the fuel cell 2 can be increased, so that the system dry-up of the fuel cell system 1 can be eliminated to recover the power generation performance of the fuel cell 2.

Then, the above flow is repeated, and when it is decided that the system dry-up state is eliminated, the flow is ended.

On the other hand, when it is decided in step S3 that there cannot be the system dry-up, it is decided in step S4 whether or not the stack dry-up starts to occur (the state of time A in FIG. 5). Specifically, the stack dry-up decision means 67 decides whether or not the coolant-gas temperature difference Tdwc calculated in step S2 is higher than the stack dry-up decision threshold value Tdstk stored in the stack dry-up decision means 67. That is, when as described above, the generated water is easily vaporized by temperature increase of the coolant, temperature increase of the cathode gas can be suppressed by heat of vaporization at the time of vaporization, so that the coolant-gas temperature difference Tdwc is increased. Accordingly, in the present embodiment, based on the coolant-gas temperature difference Tdwc, it is decided that the humidified water amount Q (g/sec) in the fuel cell 2 is decreased to start the stack dry-up.

When the decided result in step S4 is "NO" (Tdwc≤Tdstk), it is decided that there cannot be the stack dry-up, thereby ending the flow.

When the decided result in step S4 is "YES" (Tdwc>Tdstk), it is decided that the stack dry-up can start to occur, so that the routine is advanced to step S6.

In step S6, the dry-up prevention control unit 63 performs at least one of the stack dry-up prevention controls (1) to (4).

Specifically, the flow rate of the coolant is increased by the prevention control (1) to promote heat reception from the fuel cell 2 to the coolant, so that temperature increase of the coolant passed in the coolant passage 15 can be suppressed to reduce the coolant-gas temperature difference Tdwc between the coolant and the cathode gas, whereby vaporization of the generated water in the fuel cell 2 can be prevented. For this reason, the generated water amount QW and the humidified water amount Q are increased in the fuel cell 2, so that the inside of the fuel cell 2 can be humidified.

The heat radiation efficiency of the radiator 10 can be improved by the prevention control (2), so that the temperature of the coolant can be lowered, whereby the coolant-gas temperature difference Tdwc can be reduced. Thereby, as in (1), the generated water amount QW and the humidified water amount Q can be increased in the fuel cell 2 to humidify the inside of the fuel cell 2.

The pressure of the cathode off gas is increased by the prevention control (3) to facilitate condensation of moisture, so that the generated water amount QW generated in the fuel cell 2 is increased, thereby enabling the inside of the fuel cell 2 to be humidified.

The stoichiometry is reduced by the prevention control (4), so that the humidity of the cathode gas supplied to the fuel cell 2 can be increased to improve the moisture rate. In addition, the reduced stoichiometry can decrease the moisture amount (the discharged moisture amount Qout) that the cathode gas takes from the fuel cell 2, which acts in the direction increasing the humidity of the fuel cell 2. Thereby, the inside of the fuel cell 2 can be humidified.

The stack dry-up prevention controls (1) to (4) are performed, so that the fuel cell 2 can be prevented from being brought into the complete stack dry-up state to recover the power generation performance of the fuel cell 2. The flow is repeated, and when it is decided that the stack dry-up state is eliminated, the flow is ended. Further, although any one of the stack dry-up prevention controls (1) to (4) maybe performed, plural prevention controls are combined so that the stack dry-up can be eliminated more immediately.

In this way, in the present embodiment, the cathode inlet-outlet gas temperature difference Tdca and the coolant-gas temperature difference Tdwc are calculated based on the cathode outlet gas temperature Tcaout and the coolant outlet temperature Twout to use the temperature differences Tdca and Tdwc for deciding the system dry-up and the stack dry-up.

Thereby, regardless of the change in the dew point of the cathode gas supplied to the fuel cell 2 (cathode inlet gas dew point Thcain), the dry-up can be decided reliably and immediately. In addition, unlike the related art, the dry-up can be decided without additionally installing the dew point detector, so that the manufacture cost can be prevented from being increased.

In addition, in the present embodiment, when it is decided in step S4 that the stack dry-up can be started, the prevention controls (1) to (4) are performed, the stack dry-up can be eliminated without lowering the output of the fuel cell 2. Therefore, unlike Japanese Patent Application Laid-Open (JP-A) No. 2007-12454, the stack dry-up can be eliminated while the required output is satisfied.

When of the system dry-up and stack dry-up prevention controls, only the system dry-up prevention control (limiting the electrical power generation current) is adopted, execution of the system dry-up prevention control can eliminate the system dry-up in the fuel cell 2 and the humidifier 29. However, even when only the stack dry-up occurs, the electrical power generation current is also required to be limited.

On the other hand, when the system dry-up occurs in adopting only the stack dry-up prevention control, only the prevention controls (1) to (4) cannot eliminate the dry-up, so that the system dry-up is advanced.

Accordingly, in the present embodiment, in the dry-up decision control, when there cannot be the system dry-up after the system dry-up decision control is performed, the stack dry-up decision control is performed.

According to this configuration, the system dry-up decision and the stack dry-up decision are performed stepwise, so that when the system dry-up occurs, the system dry-up prevention control is performed, whereby the system dry-up of the fuel cell system 1 including the fuel cell 2 and the humidifier 29 can be eliminated.

On the other hand, when only the stack dry-up is started, the stack dry-up prevention control is performed, so that before the fuel cell is brought into the complete stack dry-up to dry the humidifier 29, the stack dry-up can be previously eliminated. In this case, without controlling the electrical power generation current, the stack dry-up can be eliminated while the required output is satisfied.

(Second Embodiment)

Next, a second embodiment of the present invention will be described. Further, in the following description, the same configurations as the first embodiment are indicated by similar reference numerals and the description thereof is omitted. While in the first embodiment, the dry-up state is decided using the temperature difference between the cathode gas and the coolant, in the present embodiment, only the coolant outlet temperature Twout is used to decide the dry-up state.

(ECU)

Figure 8:
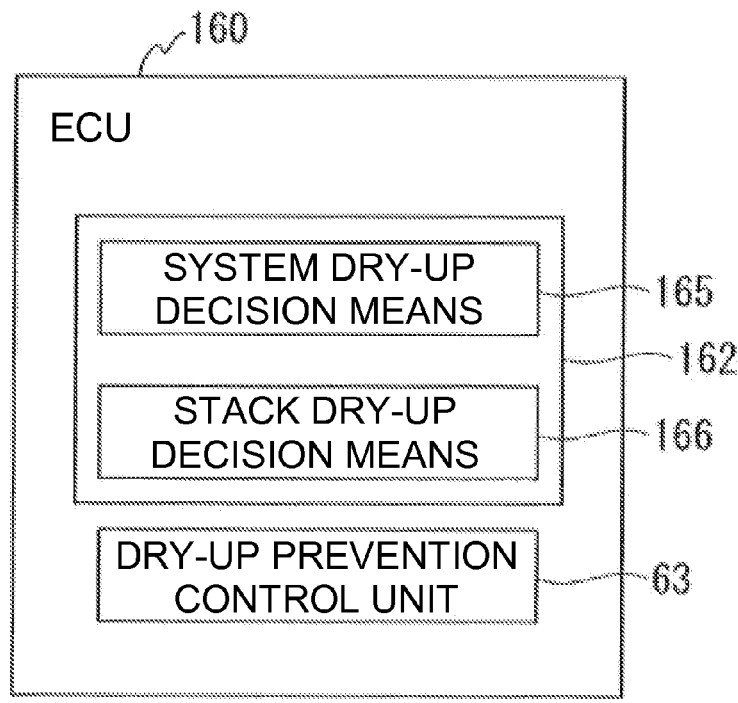
FIG. 8 is a system block diagram of an ECU according to a second embodiment.

FIG. 8 is a block diagram showing an ECU of the fuel cell system of the second embodiment.

As shown in FIG. 8, an ECU 160 of the present embodiment mainly includes a dry-up decision means 162 (a system dry-up decision means 165 and a stack dry-up decision means 166), and a dry-up prevention control unit 63.

The system dry-up decision means 165 stores a system dry-up decision threshold value (a fourth threshold value) Twsys, and compares the system dry-up decision threshold value Twsys with the coolant outlet temperature Twout measured by the coolant temperature sensor 19, thereby deciding the dry-up state of the fuel cell system 1. Specifically, when the coolant outlet temperature Twout is higher than the system dry-up decision threshold value Twsys, it is decided that there can be the system dry-up (the state of time C in FIG. 5). That is, as shown in FIG. 5, when the fuel cell is brought into the stack dry-up state to decrease the humidified water amount Q for reducing the power generation performance of the fuel cell 2, heat loss at the time of electrical power generation is increased to increase the heat generation amount of the fuel cell 2. As a result, the temperature of the coolant passed in the cooling means 13 is increased significantly, leading to the system dry-up. Accordingly, in the present embodiment, start of the system dry-up is decided based on the temperature increase of the coolant.

In addition, as shown in FIG. 8, the stack dry-up decision means 166 stores a stack dry-up decision threshold value (a third threshold value) Twstk lower than the system dry-up decision threshold value Twsys, and compares the stack dry-up decision threshold value Twstk with the coolant outlet temperature Twout measured by the coolant temperature sensor 19, thereby deciding the dry-up state of the fuel cell 2. Specifically, when the coolant outlet temperature Twout is higher than the stack dry-up decision threshold value Twstk, it is decided that the stack dry-up can be started (the state of time A in FIG. 5). That is, as shown in FIG. 5, the stack dry-up easily occurs when the temperature of the coolant passed in the cooling means 13 is high. In this case, although the coolant outlet temperature Twout is increased to a lesser extent than at the time of the system dry-up, it is increased as compared with the time of normal electrical power generation. For this reason, in the present embodiment, based on the stack dry-up decision threshold value Twstk lower than the system dry-up decision threshold value Twsys, it is decided that the stack dry-up starts to reduce the power generation performance.

Figure 9:
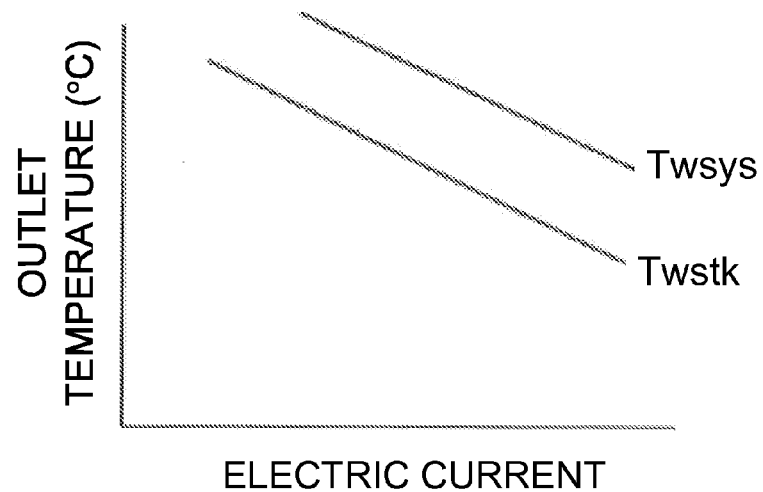
FIG. 9 is a graph showing the relation between electrical power generation currents and a system dry-up decision threshold value Twsys and a stack dry-up decision threshold value Twstk.

Here, FIG. 9 is a graph showing the relation between the electrical power generation current and the system dry-up decision threshold value Twsys, and that between the electrical power generation current and the stack dry-up decision threshold value Twstk.

As shown in FIG. 9, the dry-up decision means 165 and 166 each stores a table showing the relation between the electrical power generation current and the decision threshold value Twsys, and a table showing the relation between the electrical power generation current and the decision threshold value Twstk, in which the system dry-up decision threshold value Twsys and the stack dry-up decision threshold value Twstk are decreased according to increase of the electrical power generation current. In the fuel cell system 1, as the electrical power generation current is increased, the flow rate of the cathode gas supplied to the fuel cell 2 is increased, so that the moisture amount circulated in the fuel cell system 1 is increased. For this reason, as the electrical power generation current is increased, the generated water in the fuel cell 2 is easily vaporized, and even when the coolant outlet temperature Twout is low, the dry-up easily occurs.

(Dry-Up Decision Control)

Figure 10:
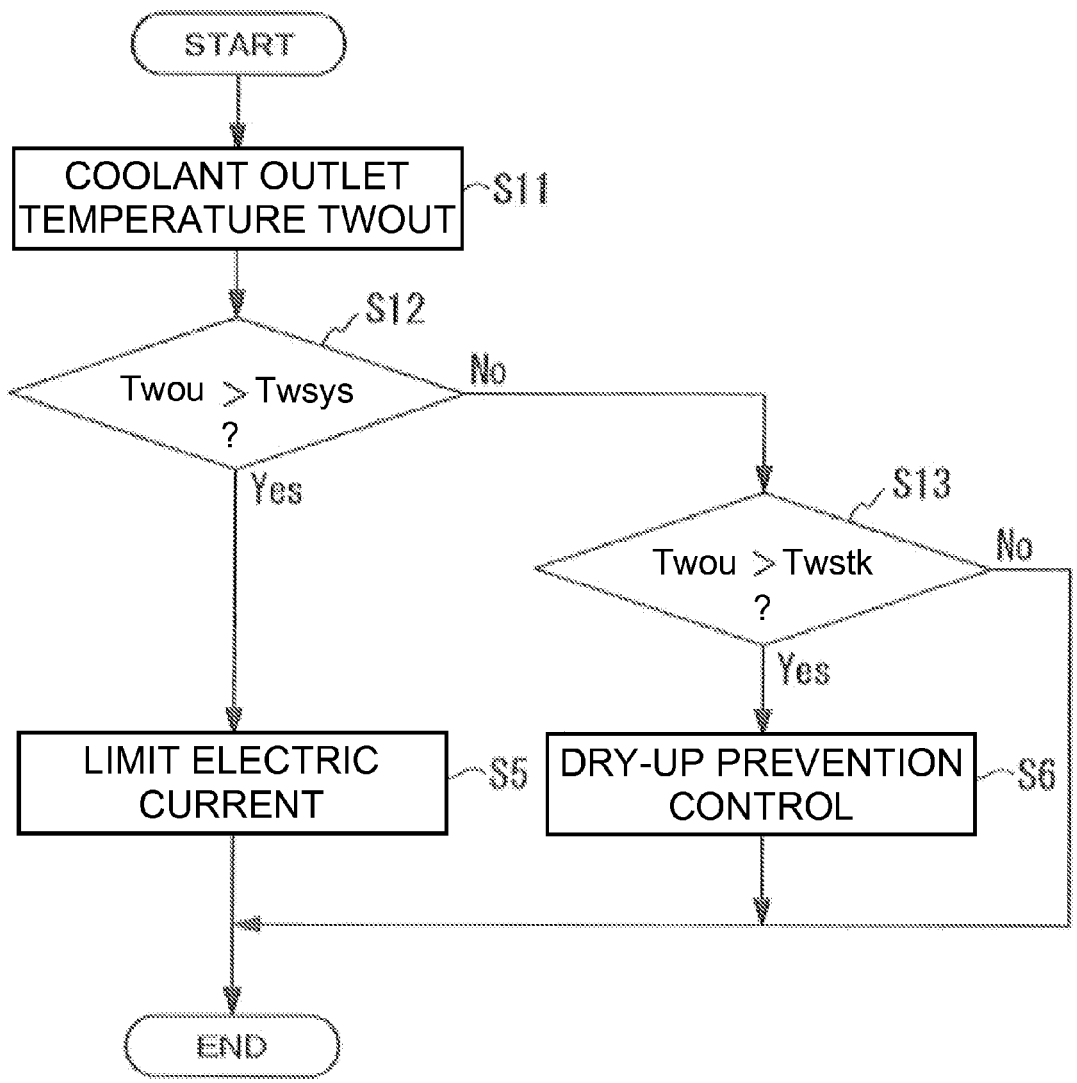
FIG. 10 is a flowchart for describing a control method of the fuel cell system according to the second embodiment.

FIG. 10 is a flowchart showing the dry-up decision control of the fuel cell system.

As shown in FIG. 10, in step S11, the coolant outlet temperature Twout is measured by the coolant temperature sensor 19.

Next, in step S12, it is decided whether or not the fuel cell system 1 can be in the system dry-up state. Specifically, the system dry-up decision means 165 decides whether or not the coolant outlet temperature Twout measured in step S11 is higher than the system dry-up decision threshold value Twsys stored in the system dry-up decision means 165.

When the decided result in step S12 is "NO" (Twout≤Twsys), it is decided that there cannot be the system dry-up, so that the routine is advanced to step S13.

When the decided result in step S12 is "YES" (Twout>Twsys), it is decided that the fuel cell system 1 can be in the system dry-up state (the state of time C in FIG. 5), so that the routine is advanced to step S5.

In step S5, as in the first embodiment, the dry-up prevention control unit 63 performs control which limits the output current value taken out from the fuel cell 2.

Then, the above flow is repeated, and when it is decided that the system dry-up state is eliminated, the flow is ended.

On the other hand, when it is decided in step S12 that there cannot be the system dry-up, it is decided in step S13 whether or not the stack dry-up is started (the state of time A in FIG. 5). Specifically, the stack dry-up decision means 166 decides whether or not the coolant outlet temperature Twout measured in step S11 is higher than the stack dry-up decision threshold value Twstk stored in the stack dry-up decision means 166.

When the decided result in step S13 is "NO" (Twout≤Twstk), it is decided that there cannot be the stack dry-up, thereby ending the flow.

When the decided result in step S13 is "YES" (Twout>Twstk), it is decided that the stack dry-up can be started, so that the routine is advanced to step S6.

In step S6, the dry-up prevention control unit 63 performs at least one of the stack dry-up prevention controls (1) to (4). Then, the above flow is repeated, and when it is decided that the stack dry-up state is eliminated, the flow is ended.

In this way, in the present embodiment, the same effect as the first embodiment can be exerted, and the dry-up decision can be performed using only the coolant outlet temperature Twout measured by the coolant temperature sensor 19. The ECU 160 can be simplifier than the first embodiment.

Although the embodiments of the present invention have been described above in detail with reference to the drawings, the specific configuration is not limited to the embodiments and design changes in the scope without departing from the purport of the present invention are included.

For instance, although in the above embodiments, the fuel cell system 1 is installed in the fuel cell vehicle, it is not limited to this and is applicable to motorcycles, robots, stationary type or portable type fuel cell systems.

In addition, although in the above embodiments, the system dry-up decision control and the stack dry-up decision control are performed stepwise, the present invention is not limited to this and only any one of the decision controls may be performed or each of the decision controls may be performed independently.

Further, although in the above embodiments, the coolant is passed along the height direction of the cell 42, it is not limited to this and may be passed along the horizontal direction (in the width direction of the cell 42).

Here, although in the above embodiments, the dry-up decision control is performed based on the coolant outlet temperature Twout, the present invention is not limited to this. That is, in the above embodiments, since the cathode gas outlet communication hole 44b and the coolant outlet communication holes 47b are arranged in the same direction of the cell 42, the cathode outlet gas temperature Tcaout and the coolant outlet temperature Twout are substantially equally changed at the time of normal electrical power generation. For this reason, the point at which the coolant outlet temperature Twout is slightly higher than the cathode outlet gas temperature Tcaout is set to the stack dry-up decision threshold value Tdstk.

On the contrary, when the coolant is passed in the horizontal direction (in the width direction of the separators 43) and the cathode outlet gas temperature Tcaout is equal to the coolant inlet temperature Twin, the coolant temperature sensor 19 is required to be provided on the coolant supply passage 14 side to perform the dry-up decision control based on the coolant inlet temperature Twin.

The present inventors have drawn by experiment that the following phenomenon in the stack dry-up in which the solid polymer membrane of the fuel cell is dried excessively occurs.

For instance, at the time of electrical power generation of the fuel cell system installed in the fuel cell vehicle and the like, when the outside air temperature in which the fuel cell system is placed is relatively high, when the vehicle speed is low at the time of driving up a slope, and so on, and when the heat generation amount of the fuel cell is large due to deterioration of the fuel cell, as described above, the temperature of the coolant is increased.

When the temperature of the coolant becomes high, the generated water in the fuel cell is easily vaporized, so that temperature increase of the oxidant gas can be suppressed by heat of vaporization at the time of vaporization. As a result, the temperature of the coolant is higher than the outlet temperature of the oxidant gas, so that the temperature difference between the temperature of the coolant and the outlet temperature of the oxidant gas starts to occur. In the fuel cell system according to the embodiment of the present invention, this state is set to the start conditions of the stack dry-up in which the solid polymer membrane of the fuel cell starts to be dried.

When the generated water is vaporized due to temperature increase of the coolant, the vaporized generated water (water vapor) is discharged together with the oxidant gas, so that the moisture amount (discharged moisture amount Qout) discharged from the fuel cell increases. At this time, while the discharged moisture amount Qout increases, the moisture amount (inputted moisture amount Qin) included in the oxidant gas supplied to the fuel cell and generated water amount (generated water amount QW) generated by electrical power generation in the fuel cell are not changed. In this case, the humidified water amount Q which is water balance in the fuel cell is expressed by Q=Qin+QW−Qout, so that the moisture amount (humidified water amount Q) in the fuel cell is eventually decreased. As a result, the solid polymer membrane of the fuel cell starts to be dried.

When the stack dry-up is started, the power generation performance of the fuel cell starts to be reduced. The reduced power generation performance decreases the generated water amount QW in the fuel cell. In addition, the reduced power generation performance of the fuel cell increases heat loss at the time of power generation, so that the heat generation amount of the fuel cell is increased. This additionally increases the temperature of the coolant, so that the discharged moisture amount Qout is increased with the elapse of time. As a result, the humidified water amount Q is decreased gradually to advance the stack dry-up.

On the contrary, according to the embodiment of the present invention, the stack dry-up is decided based on the temperature difference between the temperature of the coolant and the outlet temperature of the oxidant gas, so that it can be decided that the generated water is easily vaporized and the humidified water amount Q in the fuel cell is decreased to start the stack dry-up. Accordingly, regardless of the change in the dew point of the oxidant gas supplied to the fuel cell, it can be precisely and immediately decided that the stack dry-up is started. In addition, unlike the related art, the stack dry-up can be decided without additionally installing the dew point detector, so that the manufacture cost can be prevented from being increased.

In addition, the present inventors have found by experiment that the continuation of the stack dry-up, as described above, allows a phenomenon to occur, in which the entire fuel cell system including the solid polymer membrane of the fuel cell and a moisture exchange membrane of the humidifier is dried excessively. Hereinafter, this phenomenon will be called system dry-up, and the occurrence mechanism of this phenomenon will be described below.

When the stack dry-up is continued as-is to continue to decrease the humidified water amount Q, the humidified water amount Q is eventually lower than 0 (g/sec). Specifically, the discharged moisture amount Qout is greater than the total of the inputted moisture amount Qin and the generated water amount QW, so that moisture is taken away from the fuel cell. As a result, the fuel cell is brought into a complete stack dry-up state in which the solid polymer membrane in the fuel cell is dried excessively.

In the complete stack dry-up state, the vaporization amount of the generated water in the fuel cell is decreased to reduce heat of vaporization, so that the oxidant gas cannot be humidified. For this reason, the discharged moisture amount Qout included in the oxidant gas (hereinafter, called an oxidant off gas) discharged from the fuel cell is decreased.

When the discharged moisture amount Qout starts to be decreased, the moisture amount supplied to the humidifier is reduced to start to dry the humidifier (moisture permeable membrane). In other words, the system dry-up in which the moisture permeable membrane of the humidifier in addition to the solid polymer membrane is dried is started. Accordingly, the humidification performance of the humidifier is reduced to start to decrease the moisture amount (dew point) of the oxidant gas supplied to the fuel cell. As a result, the fuel cell system is brought into the system dry-up state in which the moisture permeable membrane of the humidifier is dried excessively, so that the voltage is lowered more.

Here, when the stack dry-up starts to occur, temperature increase of the oxidant gas is suppressed, so that the temperature difference between the outlet temperature and the inlet temperature of the oxidant gas is substantially constantly changed from the stack dry-up start point.

However, in the complete stack dry-up state, as described above, the vaporization amount of the generated water in the fuel cell is decreased to reduce heat of vaporization, so that the outlet temperature of the oxidant gas is increased. As a result, the difference between the outlet temperature and the inlet temperature of the oxidant gas is increased abruptly. In the fuel cell system according to the embodiment of the present invention, this state is set to the decision conditions of the system dry-up.

In the embodiment of the present invention, the system dry-up is decided based on the temperature difference between the outlet temperature and the inlet temperature of the oxidant gas, so that it can be decided that the dew point of the oxidant off gas is decreased excessively to reduce the humidification performance of the humidifier. Accordingly, regardless of the change in the dew point of the oxidant gas supplied to the fuel cell, it can be precisely and immediately decided that the system dry-up occurs. In addition, unlike the related art, the system dry-up can be decided without additionally installing the dew point detector, so that the manufacture cost can be prevented from being increased.

As described above, the stack dry-up easily occurs when the temperature of the coolant passed in the coolant passage is high.

Accordingly, according to the embodiment of the present invention, the stack dry-up is decided based on the temperature of the coolant. Thereby, regardless of the change in the dew point of the oxidant gas supplied to the fuel cell, the stack dry-up can be decided precisely and immediately. In addition, unlike the related art, the stack dry-up of the solid polymer membrane can be decided without additionally installing the dew point detector, so that the manufacture cost can be prevented from being increased.

As described above, when the fuel cell is brought into the stack dry-up state to reduce the power generation performance of the fuel cell, the heat generation amount of the fuel cell is increased, so that the temperature of the coolant passed in the coolant passage is increased to lead to the system dry-up.

According to the embodiment of the present invention, the system dry-up is decided based on the temperature of the coolant. Thereby, regardless of the change in the dew point of the oxidant gas supplied to the fuel cell, the system dry-up can be decided precisely and immediately. In addition, unlike the related art, the stack dry-up of the solid polymer membrane can be decided without additionally installing the dew point detector, so that the manufacture cost can be prevented from being increased.

According to the embodiment of the present invention, when it is decided that the solid polymer membrane is in the dry-up state (stack dry-up), the flow rate of the coolant passed in the coolant passage is increased, so that heat reception from the fuel cell to the coolant can be promoted. Thereby, temperature increase of the coolant passed in the coolant passage can be suppressed to prevent vaporization of the generated water generated in the fuel cell. For this reason, the moisture amount in the fuel cell can be increased to humidify the inside of the fuel cell. Therefore, when the stack dry-up is started, the stack dry-up can be eliminated without lowering the output. Unlike Japanese Patent Application Laid-Open (JP-A) No. 2007-12454, the stack dry-up can be eliminated while the required output is satisfied.

According to the embodiment of the present invention, when it is decided that the solid polymer membrane is in the dry-up state (stack dry-up), the rotational speed of the coolant fan is increased so that the heat radiation efficiency of the coolant heat exchanger can be improved. As a result, since the temperature of the coolant is lowered so that vaporization of the generated water generated in the fuel cell can be inhibited, the moisture amount in the fuel cell can be increased to humidify the inside of the fuel cell. Therefore, when the stack dry-up is started, the stack dry-up can be eliminated without lowering the output. Unlike Japanese Patent Application Laid-Open (JP-A) No. 2007-12454, the stack dry-up can be eliminated while the required output is satisfied.

According to the embodiment of the present invention, when it is decided that the fuel cell system is in the dry-up state (the system dry-up), the output current value of the fuel cell is limited, so that heat generation of the fuel cell is inhibited to lower the temperature of the coolant, whereby vaporization of the generated water generated in the fuel cell can be prevented. For this reason, the moisture amount in the fuel cell can be increased to humidify the inside of the fuel cell. Thereby, the stack dry-up in the fuel cell can be eliminated. The eliminated stack dry-up of the fuel cell can humidify the oxidant off gas discharged from the fuel cell to recover the humidification performance of the humidifier. For this reason, the amount of water moved from the oxidant off gas to the oxidant gas in the humidifier is increased, so that the moisture of the oxidant gas supplied to the fuel cell can be increased. As a result, the system dry-up of the fuel cell system can be eliminated to recover the power generation performance of the fuel cell.

Obviously, numerous modifications and variations of the present invention are possible in light of the above teachings. It is therefore to be understood that within the scope of the appended claims, the invention may be practiced otherwise than as specifically described herein.

What is claimed is:

1. A fuel cell system comprising:
  a fuel cell to generate electric power using a fuel gas and an oxidant gas supplied to the fuel cell, the fuel cell comprising:
    a solid polymer membrane;
    a fuel electrode; and
    an oxidant electrode;
  a fuel gas passage through which the fuel gas passes along the fuel electrode in the fuel cell;
  an oxidant gas passage through which the oxidant gas passes along the oxidant electrode in the fuel cell;
  a coolant passage via which a coolant flows into the fuel cell to adjust a temperature of the fuel cell;

an oxidant gas outlet temperature detector connected to the oxidant gas passage to detect an outlet temperature of the oxidant gas discharged from an outlet of the oxidant gas passage;

a coolant temperature detector connected to the coolant passage to detect an outlet temperature of the coolant passing through an outlet of the coolant passage; and an electric control unit programmed to control components of the fuel cell, said electric control unit being programmed to receive the outlet temperature of the oxidant gas detected by the oxidant gas outlet temperature detector and the outlet temperature of the coolant detected by the coolant temperature detector, the electric control unit including a dry-up controller programmed to determine that the solid polymer membrane is in a dry-up state when a temperature difference between the outlet temperature of the coolant and the outlet temperature of the oxidant gas exceeds a stack dry-up decision threshold value that is set to a point in which the outlet temperature of the coolant is slightly higher than the outlet temperature of the oxidant gas.

2. The fuel cell system according to claim 1, wherein the dry-up controller increases flow rate of the coolant passing in the coolant passage when the dry-up controller decides that the solid polymer membrane is in the dry-up state.

3. The fuel cell system according to claim 1, further comprising:

a coolant heat exchanger connected to the coolant passage to adjust the temperature of the coolant passing through the coolant passage; and a fan to deliver air toward the coolant heat exchanger to cool the coolant, wherein the dry-up controller increases a rotational speed of the fan when the dry-up controller decides that the solid polymer membrane is in the dry-up state.

4. The fuel cell system according to claim 2, further comprising:

a coolant heat exchanger connected to the coolant passage to adjust the temperature of the coolant passing through the coolant passage; and a fan to deliver air toward the coolant heat exchanger to cool the coolant, wherein the dry-up controller increases a rotational speed of the fan when the dry-up controller decides that the solid polymer membrane is in the dry-up state.

5. A fuel cell system comprising:

a fuel cell to generate electric power using a fuel gas and an oxidant gas supplied to the fuel cell, the fuel cell comprising:
  a solid polymer membrane;
  a fuel electrode; and
  an oxidant electrode;

a fuel gas passage through which the fuel gas passes along the fuel electrode in the fuel cell;

an oxidant gas passage through which the oxidant gas passes along the oxidant electrode in the fuel cell;

a coolant passage via which a coolant flows into the fuel cell to adjust a temperature of the fuel cell;

oxidant gas outlet temperature detecting means for detecting an outlet temperature of the oxidant gas discharged from an outlet of the oxidant gas passage;

coolant temperature detecting means for detecting an outlet temperature of the coolant passing through an inlet or an outlet of the coolant passage; and means for deciding that the solid polymer membrane is in a dry-up state when a temperature difference between the outlet temperature of the coolant and the outlet temperature of the oxidant gas exceeds a stack dry-up decision threshold value that is set to a point in which the outlet temperature of the coolant is slightly higher than the outlet temperature of the oxidant gas.

6. The fuel cell system according to claim 1, wherein the stack dry-up decision threshold value is about 1° C.

7. The fuel cell system according to claim 5,
wherein the means for determining increases flow rate of the coolant passing in the coolant passage when the means for determining decides that the solid polymer membrane is in the dry-up state.

8. The fuel cell system according to claim 7, further comprising:

a coolant heat exchanger connected to the coolant passage to adjust the temperature of the coolant passing through the coolant passage; and a fan to deliver air toward the coolant heat exchanger to cool the coolant, wherein the means for determining increases a rotational speed of the fan when the means for determining decides that the solid polymer membrane is in the dry-up state.

9. The fuel cell system according to claim 5, further comprising:

a coolant heat exchanger connected to the coolant passage to adjust the temperature of the coolant passing through the coolant passage; and a fan to deliver air toward the coolant heat exchanger to cool the coolant, wherein the means for determining increases a rotational speed of the fan when the means for determining decides that the solid polymer membrane is in the dry-up state.

10. The fuel cell system according to claim 5, wherein the stack dry-up decision threshold value is about 1° C.

11. A method of operating a fuel cell system, the fuel cell system including: a fuel cell to generate electric power using a fuel gas and an oxidant gas supplied to the fuel cell, the fuel cell including a solid polymer membrane, a fuel electrode, and an oxidant electrode; a fuel gas passage through which the fuel gas passes along the fuel electrode in the fuel cell; an oxidant gas passage through which the oxidant gas passes along the oxidant electrode in the fuel cell; and a coolant passage via which a coolant flows into the fuel cell to adjust a temperature of the fuel cell, said method comprising detecting an outlet temperature of the oxidant gas discharged from an outlet of the oxidant gas passage;

detecting an outlet temperature of the coolant passing through an outlet of the coolant passage; and determining that the solid polymer membrane is in a dry-up state when a temperature difference between the outlet temperature of the coolant and the outlet temperature of the oxidant gas exceeds a stack dry-up decision threshold value that is set to a point in which the outlet temperature of the coolant is slightly higher than the outlet temperature of the oxidant gas.

12. The method according to claim 11, further comprising:
increasing a flow rate of the coolant passing in the coolant passage when the solid polymer membrane is determined to be in the dry-up state.

13. The method according to claim 12, further comprising:
providing a coolant heat exchanger connected to the coolant passage to adjust the temperature of the coolant passing through the coolant passage;

providing a fan to deliver air toward the coolant heat exchanger to cool the coolant; and increasing a rotational speed of the fan when the solid polymer membrane is determined to be in the dry-up state.

14. The method according to claim 11, further comprising:

providing a coolant heat exchanger connected to the coolant passage to adjust the temperature of the coolant passing through the coolant passage;

providing a fan to deliver air toward the coolant heat exchanger to cool the coolant; and increasing a rotational speed of the fan when the solid polymer membrane is determined to be in the dry-up state.

15. The method according to claim 11, wherein the stack dry-up decision threshold value is about 1° C.

* * * * *